United States Patent
Yamazaki

(10) Patent No.: US 11,958,113 B2
(45) Date of Patent: Apr. 16, 2024

(54) THREE-DIMENSIONAL SHAPED ARTICLE PRODUCTION METHOD, THREE-DIMENSIONAL SHAPING APPARATUS, AND INFORMATION PROCESSING APPARATUS

(71) Applicant: SEIKO EPSON CORPORATION, Tokyo (JP)

(72) Inventor: Satoshi Yamazaki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 60 days.

(21) Appl. No.: 17/511,632

(22) Filed: Oct. 27, 2021

(65) Prior Publication Data

US 2022/0134438 A1 May 5, 2022

(30) Foreign Application Priority Data

Oct. 29, 2020 (JP) .................. 2020-181597

(51) Int. Cl.
  *B22F 10/85* (2021.01)
  *B33Y 50/02* (2015.01)
  *B29C 64/393* (2017.01)
  *B33Y 30/00* (2015.01)
  *B33Y 10/00* (2015.01)

(52) U.S. Cl.
  CPC ............ *B22F 10/85* (2021.01); *B29C 64/393* (2017.08); *B33Y 30/00* (2014.12); *B33Y 50/02* (2014.12); *B33Y 10/00* (2014.12)

(58) Field of Classification Search
  CPC ......... B22F 10/85; B33Y 10/00; B33Y 50/02; B29C 64/393
  See application file for complete search history.

(56) References Cited

U.S. PATENT DOCUMENTS

| 2007/0179657 A1 | 8/2007 | Holzwarth |
| 2014/0121813 A1* | 5/2014 | Schmehl ............... B33Y 50/02 700/119 |
| 2017/0136703 A1* | 5/2017 | Hayes ............... G05B 19/4099 |
| 2020/0164575 A1* | 5/2020 | Yuwaki .................. B22F 12/53 |

FOREIGN PATENT DOCUMENTS

| JP | 2009-525207 A | 7/2009 |
| JP | 2019025761 A * | 2/2019 |

* cited by examiner

*Primary Examiner* — Farah Taufiq
(74) *Attorney, Agent, or Firm* — Global IP Counselors, LLP

(57) ABSTRACT

A three-dimensional shaped article production method for producing a three-dimensional shaped article by ejecting a shaping material to a stage and stacking layers according to a path including multiple partial paths is provided. The production method includes a first step of specifying a gap portion occurring inside the three-dimensional shaped article based on first shaping data having data for shaping a first portion that is a part of the three-dimensional shaped article by stacking layers having a first thickness and data for shaping a second portion that is adjacent to the first portion in a direction orthogonal to a stacking direction of the layers with a layer having a second thickness corresponding to a thickness of the first portion, a second step of generating second shaping data from the first shaping data by changing the first shaping data so as to fill up the gap portion when the gap portion is specified, and a third step of shaping the three-dimensional shaped article by ejecting the shaping material according to the second shaping data.

7 Claims, 11 Drawing Sheets

THREE-DIMENSIONAL SHAPED ARTICLE PRODUCTION METHOD, THREE-DIMENSIONAL SHAPING APPARATUS, AND INFORMATION PROCESSING APPARATUS

The present application is based on, and claims priority from JP Application Serial Number 2020-181597, filed Oct. 29, 2020, the disclosure of which is hereby incorporated by reference herein in its entirety.

BACKGROUND

1. Technical Field

The present disclosure relates to a three-dimensional shaped article production method, a three-dimensional shaping apparatus, and an information processing apparatus.

2. Related Art

With respect to a three-dimensional shaped article production method, for example, in JP-T-2009-525207 (Patent Document 1), a technique for generating a build path that determines a void region and generating a remnant path in the void region is disclosed. In Patent Document 1, the three-dimensional shaped article is shaped by moving a nozzle that performs extrusion of a shaping material according to the generated build path and remnant path and depositing the extruded material in a layer form. According to this, the void region is filled up with the extruded material so that the occurrence of a void in the three-dimensional shaped article is suppressed.

However, in the technique of the Patent Document 1, even if the void region was filled up, there was a case where the strength of the three-dimensional shaped article in a thickness direction of the layers is not sufficiently ensured. Therefore, a technique for suppressing the occurrence of a void in the three-dimensional shaped article and improving the strength in the thickness direction has been demanded.

SUMMARY

According to a first aspect of the present disclosure, a three-dimensional shaped article production method for producing a three-dimensional shaped article by ejecting a shaping material to a stage and stacking layers according to a path including multiple partial paths is provided. The production method includes a first step of specifying a gap portion occurring inside the three-dimensional shaped article based on first shaping data having data for shaping a first portion that is a part of the three-dimensional shaped article by stacking layers having a first thickness and data for shaping a second portion that is a part of the three-dimensional shaped article and is adjacent to the first portion in a direction orthogonal to a stacking direction of the layers with a layer having a second thickness corresponding to a thickness of the first portion, a second step of generating second shaping data from the first shaping data by changing the first shaping data so as to fill up the gap portion when the gap portion is specified, and a third step of shaping the three-dimensional shaped article by ejecting the shaping material according to the second shaping data.

According to a second aspect of the present disclosure, a three-dimensional shaping apparatus is provided. The three-dimensional shaping apparatus includes a stage, an ejection section that ejects a shaping material to the stage, a moving mechanism section that moves the ejection section with respect to the stage, and a control unit that controls the ejection section and the moving mechanism section so as to eject a shaping material to the stage from the ejection section according to a path including multiple partial paths and stack layers, thereby shaping a three-dimensional shaped article. The control unit specifies a gap portion occurring inside the three-dimensional shaped article based on first shaping data having data for shaping a first portion that is a part of the three-dimensional shaped article by stacking layers having a first thickness and data for shaping a second portion that is a part of the three-dimensional shaped article and is adjacent to the first portion in a direction orthogonal to a stacking direction of the layers with a layer having a second thickness corresponding to a thickness of the first portion, generates second shaping data from the first shaping data by changing the first shaping data so as to fill up the gap portion when the gap portion is specified, and shapes the three-dimensional shaped article by ejecting the shaping material from the ejection section according to the second shaping data.

According to a third aspect of the present disclosure, an information processing apparatus for generating data for producing a three-dimensional shaped article by ejecting a shaping material to a stage and stacking layers according to a path including multiple partial paths is provided. The information processing apparatus includes a data generating section that specifies a gap portion occurring inside the three-dimensional shaped article based on first shaping data having data for shaping a first portion that is a part of the three-dimensional shaped article by stacking layers having a first thickness and data for shaping a second portion that is a part of the three-dimensional shaped article and is adjacent to the first portion in a direction orthogonal to a stacking direction of the layers with a layer having a second thickness corresponding to a thickness of the first portion, and generates second shaping data from the first shaping data by changing the first shaping data so as to fill up the gap portion when the gap portion is specified.

DESCRIPTION OF EXEMPLARY EMBODIMENTS

A. First Embodiment

Figure 1:
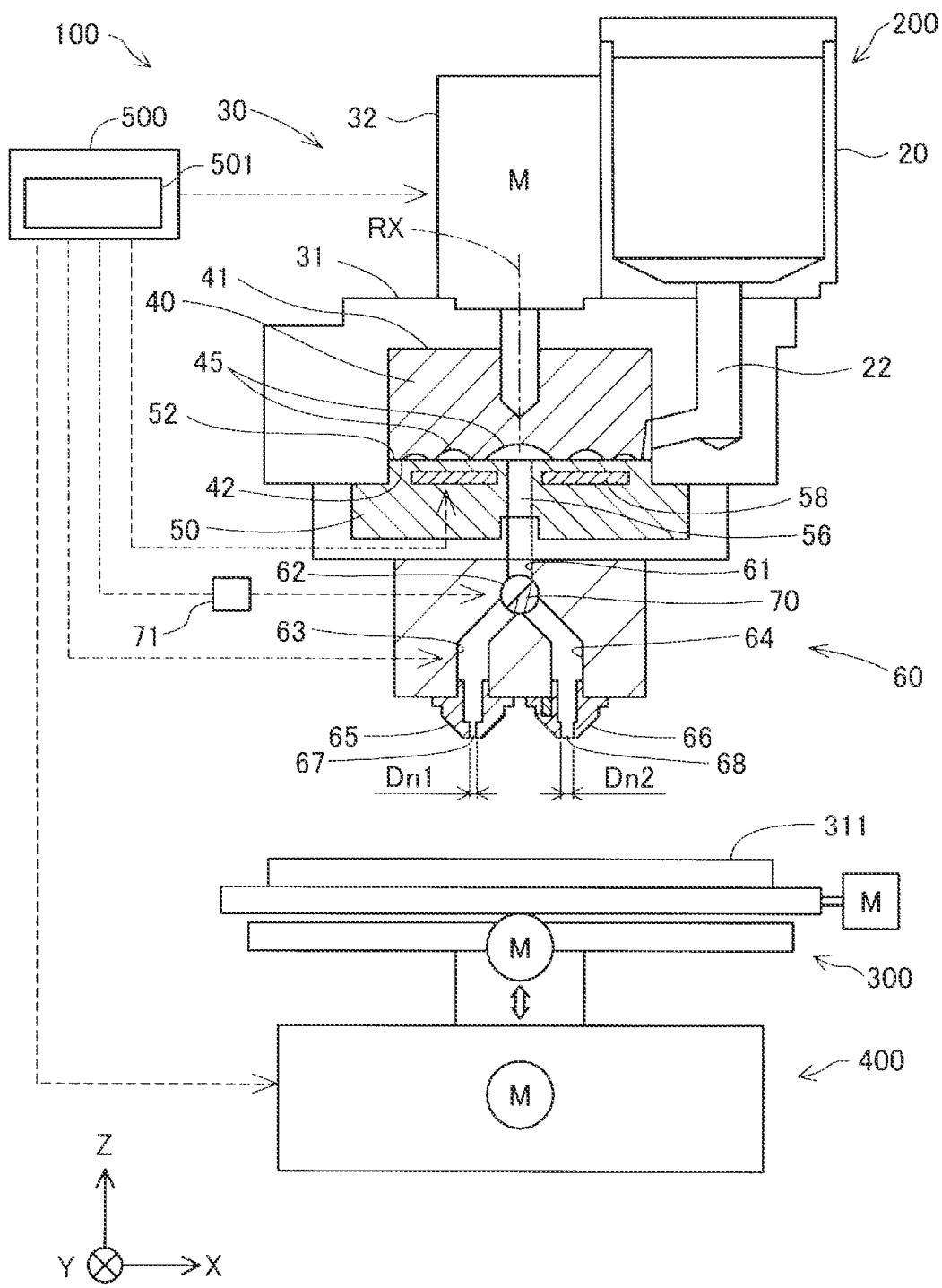
FIG. 1 is a view showing a schematic configuration of a three-dimensional shaping apparatus in a first embodiment.

FIG. 1 is a view showing a schematic configuration of a three-dimensional shaping apparatus 100 in a first embodiment. In FIG. 1, arrows along X, Y, and Z directions orthogonal to one another are illustrated. The X, Y, and Z directions are directions along an X axis, a Y axis, and a Z axis that are three spatial axes orthogonal to one another, and each include both of one side direction along the X axis, Y axis, and Z axis and a direction opposite thereto. The X axis and Y axis are axes along a horizontal plane, and the Z axis is an axis along a vertical line. In other drawings, arrows along the X, Y, and Z directions are also illustrated as appropriate. The X, Y, and Z directions in FIG. 1 and the X, Y, and Z directions in the other drawings indicate the same directions, respectively. Further, a plane along the X direction and the Y direction is sometimes referred to as an XY plane, and a plane along the X direction and the Z direction is sometimes referred to as an XZ plane. In this specification, the "orthogonal" includes a range of 90°±10°.

The three-dimensional shaping apparatus 100 includes a control unit 500 that controls the three-dimensional shaping apparatus 100, a shaping section 200 that forms and ejects a shaping material, a stage 300 for shaping to serve as a base stand for a three-dimensional shaped article, and a moving mechanism section 400 that controls an ejection position of the shaping material.

The shaping section 200 melts a material in a solid state to form a shaping material in a paste form and ejects the shaping material onto the stage 300 under the control of the control unit 500. The shaping section 200 includes a material supply section 20 that is a supply source of the material before being transformed into the shaping material, a plasticizing section 30 that plasticizes the material to form the shaping material, and an ejection section 60 that ejects the formed shaping material.

In the material supply section 20, a material in a state of a pellet, a powder, or the like is stored. In this embodiment, a resin formed into a pellet shape is used as the material. The material supply section 20 in this embodiment is constituted by a hopper. A supply channel 22 that couples the material supply section 20 to the plasticizing section 30 is provided below the material supply section 20. The material supply section 20 supplies the material to the plasticizing section 30 through the supply channel 22. The details of the material will be described later.

The plasticizing section 30 includes a screw case 31, a driving motor 32, a screw 40, and a barrel 50. The plasticizing section 30 plasticizes at least a part of the material supplied from the material supply section 20 to form the shaping material in a paste form having fluidity and supplies the shaping material to the ejection section 60. The "plasticizing" means melting by applying heat to a material having thermoplasticity. The "melting" not only means transforming a material having thermoplasticity into a liquid by heating the material to a temperature equal to or higher than the melting point, but also means softening a material having thermoplasticity by heating the material to a temperature equal to or higher than the glass transition point so as to exhibit fluidity. The screw 40 of this embodiment is a so-called screw and is sometimes referred to as "scroll".

The screw case 31 is a housing for housing the screw 40. To a lower face of the screw case 31, the barrel 50 is fixed, and the screw 40 is housed in a space surrounded by the screw case 31 and the barrel 50. The screw 40 has a grooved face 42 having a groove 45 formed therein at a face opposed to the barrel 50. To an upper face of the screw case 31, the driving motor 32 is fixed. A rotational axis of the driving motor 32 is coupled to the screw 40 at an upper face 41 side. The driving motor 32 need not be directly coupled to the screw 40, and for example, the screw 40 and the driving motor 32 may be coupled through a decelerator. The driving motor 32 is driven under the control of the control unit 500.

The barrel 50 is disposed below the screw 40. The barrel 50 has a screw opposed face 52 opposed to the grooved face 42 of the screw 40. The barrel 50 is provided with a communication hole 56 that communicates with a supply flow channel 61 of the ejection section 60 described below on the central axis RX of the screw 40. In the barrel 50, a heater 58 is incorporated at a position opposed to the groove 45 of the screw 40. The temperature of the heater 58 is controlled by the control unit 500.

Figure 2:
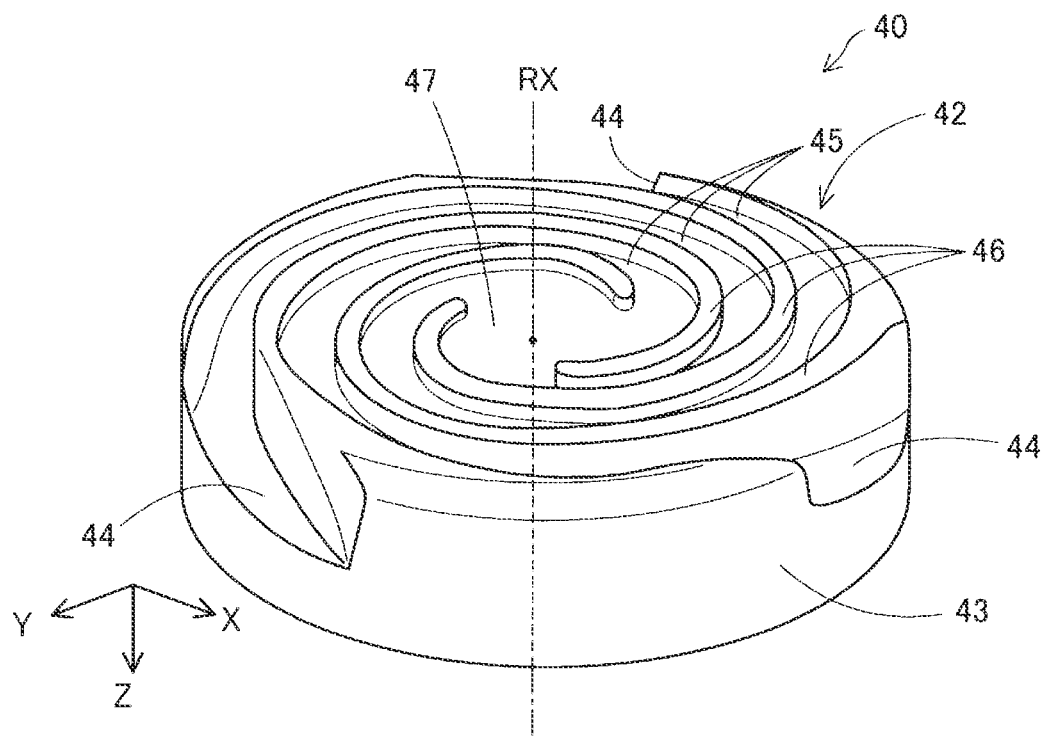
FIG. 2 is a schematic perspective view showing a configuration of a screw at a grooved face side.

FIG. 2 is a schematic perspective view showing a configuration of the screw 40 at the grooved face 42 side. A central portion 47 of the grooved face 42 of the screw 40 is configured as a recess to which one end of the groove 45 is coupled. The central portion 47 is opposed to the communication hole 56 of the barrel 50 shown in FIG. 1. The central portion 47 crosses the central axis RX.

The groove 45 constitutes a so-called scroll groove. The groove 45 extends in a spiral shape so as to draw an arc toward the outer circumference of the screw 40 from the central portion 47. The groove 45 may be configured to extend in an involute curve shape or in a helical shape. In the grooved face 42, a projecting ridge portion 46 that constitutes a side wall portion of the groove 45 and that extends along each groove 45 is provided. The groove 45 continues to a material inlet 44 formed in a side face 43 of the screw 40. This material inlet 44 is a portion for receiving the material supplied through the supply channel 22 of the material supply section 20. As shown in FIG. 2, in this embodiment, three grooves 45 are formed separated by the projecting ridge portion 46. The number of grooves 45 is not limited to 3, and may be 1 or 2 or more. The shape of the groove 45 is not limited to a spiral shape, and may be a helical shape or an involute curve shape, or may be a shape extending so as to draw an arc toward the outer circumference from the central portion.

Figure 3:
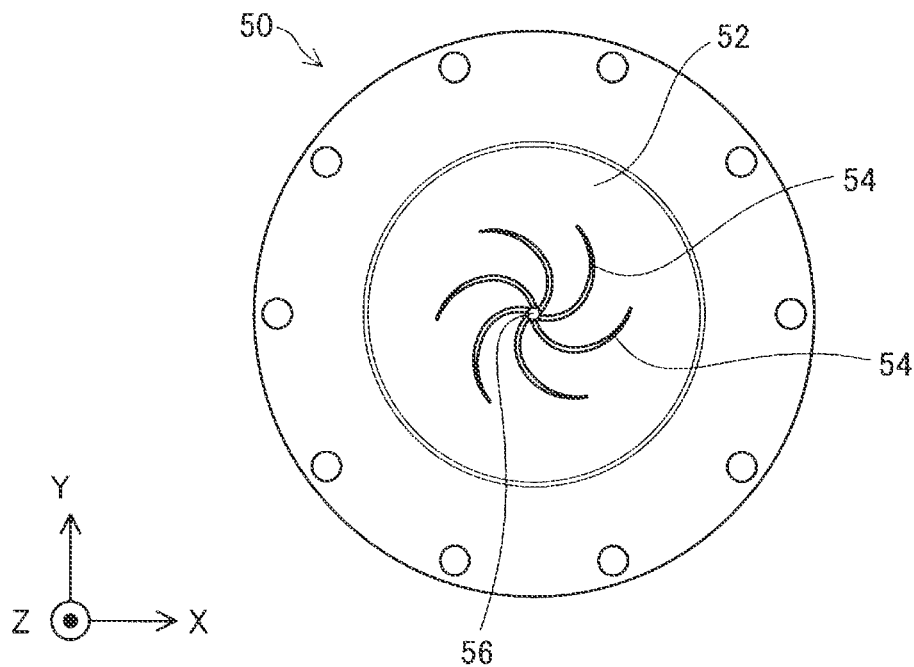
FIG. 3 is a top view showing a configuration of a barrel at a screw opposed face side.

FIG. 3 is a top view showing a configuration of the barrel 50 at the screw opposed face 52 side. As described above, at the center of the screw opposed face 52, the communication hole 56 is formed. Around the communication hole 56 in the screw opposed face 52, multiple guide grooves 54 are formed. One end of each of the guide grooves 54 is coupled to the communication hole 56, and each guide groove 54 extends in a spiral shape toward the outer circumference of the screw opposed face 52 from the communication hole 56. Each guide groove 54 has a function of guiding the shaping material to the communication hole 56. One end of the guide groove 54 need not be coupled to the communication hole 56. Further, in the barrel 50, the guide groove 54 need not be formed.

As shown in FIG. 1, the ejection section 60 includes the supply flow channel 61, a coupling portion 62, a first branch flow channel 63, a second branch flow channel 64, and a nozzle. The ejection section 60 of this embodiment includes a first nozzle 65 and a second nozzle 66 as the nozzle. The supply flow channel 61 is a flow channel of the shaping material provided between the communication hole 56 of the barrel 50 and the coupling portion 62. The first branch flow channel 63 is a flow channel provided between the first nozzle 65 and the coupling portion 62. The second branch flow channel 64 is a flow channel provided between the second nozzle 66 and the coupling portion 62. According to this, in the ejection section 60, a flow channel divided into two branches at the coupling portion 62 is formed. The shaping material that is supplied to the ejection section 60 from the plasticizing section 30 and flows in the coupling portion 62 through the supply flow channel 61 is ejected from the first nozzle 65 when it flows in the first branch flow channel 63, and ejected from the second nozzle 66 when it flows in the second branch flow channel 64.

The coupling portion 62 is a hole extending in the Y direction crossing the supply flow channel 61, the first branch flow channel 63 and the second branch flow channel 64. In the coupling portion 62, a valve mechanism 70 for switching the flow of the shaping material flowing through the flow channel in the ejection section 60 is inserted. The valve mechanism 70 is a valve body having a crescent cross-sectional shape configured to be rotatable in the coupling portion 62. The valve mechanism 70 can permit the flow of the shaping material to only either one of the first branch flow channel 63 and the second branch flow channel 64 by rotation so as to block one of the branch flow channels and allow the other branch flow channel to communicate therewith. Further, by adjusting the rotation angle of the valve mechanism 70, the flow rate of the shaping material to the branch flow channel can be adjusted. Moreover, the valve mechanism 70 can block both the first branch flow channel 63 and the second branch flow channel 64 by rotation. Therefore, the valve mechanism 70 can switch the nozzle that ejects the shaping material, adjust the amount of the shaping material to be ejected from the nozzle, and switch between on and off of ejection of the shaping material from the ejection section 60. The valve mechanism 70 is driven by driving of a valve mechanism driving section 71. The valve mechanism driving section 71 is constituted by, for example, a stepping motor, and is controlled by the control unit 500. In other embodiments, the valve mechanism 70 may be configured so as to only perform switching of the nozzles that eject the shaping material. In this case, the control unit 500 can adjust the amount of the shaping material to be ejected from each nozzle by adjusting the rotational speed of the screw 40.

In this embodiment, a nozzle diameter Dn2 of the second nozzle 66 is larger than a nozzle diameter Dn1 of the first nozzle 65. The nozzle diameter Dn1 of the first nozzle 65 is the smallest diameter in a first nozzle hole 67, and the nozzle diameter Dn2 of the second nozzle 66 is the smallest diameter in a second nozzle hole 68. The first nozzle hole 67 is a portion in which the cross section of the flow channel provided in an end portion in the first nozzle 65 at a side communicating with the atmosphere is reduced. The second nozzle hole 68 is a portion in which the cross section of the flow channel provided in an end portion in the second nozzle 66 at a side communicating with the atmosphere is reduced.

In this embodiment, the shape of each of the nozzle holes is a circular shape. The opening shape of each of the nozzle holes is not limited to a circular shape and may be, for example, a rectangular shape or a polygonal shape other than a rectangular shape.

The stage 300 is disposed at a position opposed to the ejection section 60. As described below, the three-dimensional shaping apparatus 100 shapes a three-dimensional shaped article by ejecting the shaping material to a shaping face 311 of the stage 300 from the ejection section 60 and stacking layers.

The moving mechanism section 400 changes the relative position of the ejection section 60 to the stage 300. In this embodiment, the moving mechanism section 400 moves the stage 300 with respect to the ejection section 60. Note that the relative positional change of the ejection section 60 to the stage 300 is sometimes simply referred to as "movement of the ejection section 60". In this embodiment, for example, "to move the stage 300 in the +X direction" can also be paraphrased as "to move the ejection section 60 in the −X direction". The moving mechanism section 400 in this embodiment is constituted by a three-axis positioner for moving the stage 300 in the three axis directions of the X, Y, and Z directions by the driving forces of three motors. Each motor drives under the control of the control unit 500. The moving mechanism section 400 need not be configured to move the stage 300, but may be configured to move the ejection section 60 without moving the stage 300. In addition, the moving mechanism section 400 may be configured to move both the stage 300 and the ejection section 60.

The control unit 500 is a control device that controls the entire operation of the three-dimensional shaping apparatus 100. The control unit 500 is constituted by a computer including one or multiple processors, a main storage device, and an input/output interface for performing signal input/output to/from the outside. The control unit 500 exhibits various functions such as a function of executing the below-mentioned three-dimensional shaping process or a function as a data generating section 501 by execution of a program or a command read in the main storage device by the processor. The control unit 500 may be realized by a configuration in which multiple circuits for realizing at least some of the functions are combined instead of being constituted by a computer. The control unit 500 is sometimes referred to as "information processing apparatus".

The three-dimensional shaping process refers to a process for shaping a three-dimensional shaped article. The three-dimensional shaping process is executed by the control unit 500 when a predetermined start operation is performed by a user through an operation panel provided in the three-dimensional shaping apparatus 100 or a computer coupled to the three-dimensional shaping apparatus 100. The three-dimensional shaping process is sometimes simply referred to as "shaping process".

Figure 4:
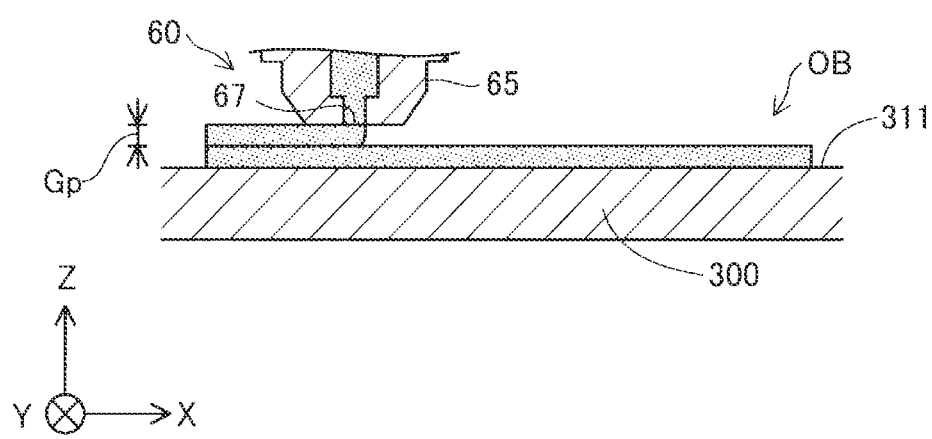
FIG. 4 is a schematic view schematically showing a manner of shaping a three-dimensional shaped article.

FIG. 4 is a schematic view schematically showing a manner of shaping the three-dimensional shaped article OB by the three-dimensional shaping process. The control unit 500 appropriately controls the ejection section 60 and the moving mechanism section 400 shown in FIG. 1 according to the below-mentioned shaping data in the shaping process so as to eject the shaping material to the stage 300 from the ejection section 60 and stack layers of the shaping material on the shaping face 311 in the Z direction that is the stacking direction, whereby the three-dimensional shaped article OB is shaped. Specifically, the control unit 500 ejects the shaping material from the nozzle while moving the nozzle in a direction along the shaping face 311 as shown in FIG. 4. The shaping material ejected from the nozzle is continuously deposited in the moving direction of the nozzle. By doing this, a region linearly extending along the moving path of the nozzle is shaped. Further, the control unit 500 forms a layer of the shaping material by further ejecting the shaping material onto the shaping material having already been ejected. The control unit 500 ejects the shaping material from the nozzle while maintaining a distance between the nozzle and an ejection target in the shaping process. The ejection target is the shaping face 311 when the shaping material is ejected onto the shaping face 311, and is an upper face of the shaping material having already been ejected when the shaping material is ejected onto the shaping material having already been ejected. The distance between the nozzle and the ejection target is sometimes referred to as "gap Gp". Further, in FIG. 4, only the first nozzle 65 is shown, and the second nozzle 66 is omitted, but the same shall apply even if the three-dimensional shaped article OB is shaped using either nozzle.

The data generating portion 501 generates the shaping data using shape data such as three-dimensional CAD data that represent the shape of the three-dimensional shaped article. The shaping data of this embodiment are data that designate a linear partial path that represents a path in which the nozzle of the ejection section 60 ejects the shaping material and moves, and a stacking pitch and a line width in each partial path. The stacking pitch refers to a thickness of the shaping material to be ejected in each partial path. The line width refers to a width of the shaping material to be ejected in each partial path. The stacking pitch and the line width are determined by the size of the above-mentioned gap Gp and the amount of the shaping material to be ejected from the nozzle per unit movement amount. For example, when the gap Gp is small, as compared to a case where the gap Gp is large, the shaping material ejected from the nozzle is pressed against the ejection target by the nozzle, and therefore, the stacking pitch becomes smaller and the line width becomes larger. The amount of the shaping material to be ejected from the nozzle per unit movement amount is determined by, for example, the moving speed of the nozzle and the amount of the shaping material to be ejected from the nozzle per unit time. The amount of the shaping material to be ejected from the nozzle per unit time is determined by, for example, the nozzle diameter, the flow rate of the shaping material flowing in the ejection section 60, or the like.

Figure 5:
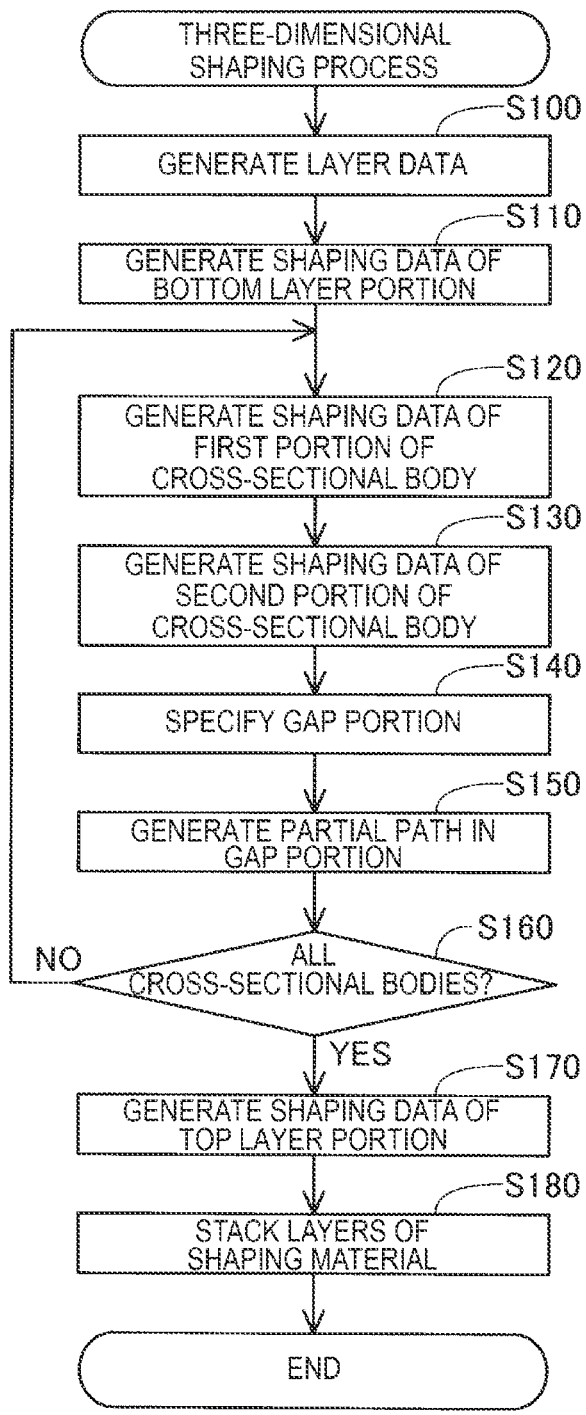
FIG. 5 is a process chart showing a three-dimensional shaping process in the first embodiment.

FIG. 5 is a process chart showing the three-dimensional shaping process realizing the method for producing the three-dimensional shaped article OB. FIGS. 6 to 9 are each a cross-sectional view showing one example of a shape of the three-dimensional shaped article OB to be shaped in the three-dimensional shaping process of this embodiment.

In Step S100 in FIG. 5, the control unit 500 generates slice data by analyzing three-dimensional CAD data that are the shape data of the three-dimensional shaped article OB input from the outside, and slicing the three-dimensional shaped article OB along the XY plane. In this embodiment, the control unit 500 generates cross-sectional body data, shape data of a bottom layer portion, and shape data of a top layer portion as the slice data. The shape data of the bottom layer portion are data that represent a shape of a bottom layer portion BL including a bottom face in the three-dimensional shaped article OB. The shape data of the top layer portion are data that represent a shape of a top layer portion TL including a top face in the three-dimensional shaped article OB. The cross-sectional body data are data that represent shapes of cross-sectional bodies of the three-dimensional shaped article OB.

Figure 6:
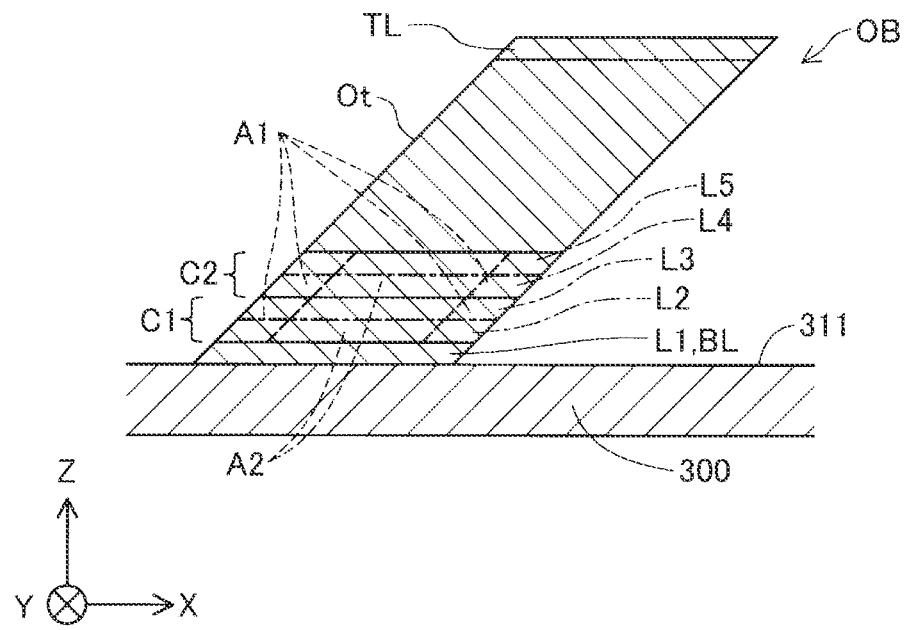
FIG. 6 is a cross-sectional view showing one example of a shape of the three-dimensional shaped article.

The cross-sectional body is a portion divided to a predetermined thickness in the three-dimensional shaped article OB. The cross-sectional body of this embodiment is each portion obtained by dividing a portion excluding the bottom layer portion BL and the top layer portion TL into multiple portions along the Z direction in the three-dimensional shaped article OB. In FIG. 6, only a first cross-sectional body C1 and a second cross-sectional body C2 are shown among the cross-sectional bodies, and the other cross-sectional bodies are omitted. The cross-sectional body has a first portion A1 and a second portion A2 each of which is a part of the cross-sectional body. The second portion A2 is a portion adjacent to the first portion A1 in a direction orthogonal to the stacking direction. In this embodiment, the first portion A1 is a portion corresponding to an outline region in the cross-sectional body. The second portion A2 is a portion corresponding to an inner region in the cross-sectional body and is adjacent to the first portion A1 in the X direction and the Y direction. The outline region is a region that forms an outline Ot of the three-dimensional shaped article OB, and is a region that has an effect on the appearance of the three-dimensional shaped article OB. The inner region is a region in the inner side of the outline region of the cross-sectional body.

Each cross-sectional body can also be referred to as one three-dimensional shaped article. That is, it can also be said, in other words, that the three-dimensional shaped article OB of this embodiment is constituted by the bottom layer portion BL, the top layer portion TL, and multiple cross-sectional bodies that are three-dimensional shaped articles. It can also be said, in other words, that the first portion A1 and the second portion A2 are portions of the three-dimensional shaped article. In other embodiments, the three-dimensional shaped article OB may have only one cross-sectional body. Further, the three-dimensional shaped article OB need not have the top layer portion TL or the bottom layer portion BL, and may be constituted by, for example, only one or multiple cross-sectional bodies.

The control unit 500 first generates layer data by slicing the three-dimensional shaped article OB along the XY plane so as to divide the three-dimensional shaped article OB into multiple layers having a first thickness P1 in Step S100 in FIG. 5. Then, the control unit 500 recognizes the layer data for one layer of the lowermost portion as the shape data of the bottom layer portion and recognizes the layer data for one layer of the uppermost portion as the shape data of the top layer portion. Subsequently, the control unit 500 generates multiple sets of layer data while regarding the layer data for upper and lower two layers as one set in the layer data other than the shape data of the bottom layer portion and the shape data of the top layer portion. The control unit 500 recognizes this one set of layer data as one cross-sectional body data. That is, the cross-sectional body of this embodiment has a thickness twice the first thickness P1.

In the following description, the shape of the three-dimensional shaped article OB is sometimes described using a layer represented by the layer data. For example, as shown in FIG. 6, the bottom layer portion BL is a portion corresponding to a first layer L1 represented by the layer data. Further, the first cross-sectional body C1 is a cross-sectional body including a portion corresponding to a second layer L2 and a portion corresponding to a third layer L3, and the second cross-sectional body C2 is a cross-sectional body including a portion corresponding to a fourth layer L4 and a portion corresponding to a fifth layer L5.

In Step S110 in FIG. 5, the control unit 500 generates shaping data of the bottom layer portion that are shaping data for shaping the bottom layer portion BL. More specifically, in Step S110, the control unit 500 generates a partial path RB for shaping the bottom layer portion BL based on the shape data of the bottom layer portion generated in Step S100, and also determines the stacking pitch and the line width in each partial path RB, thereby generating the shaping data of the bottom layer portion for shaping the bottom layer portion BL.

Figure 7:
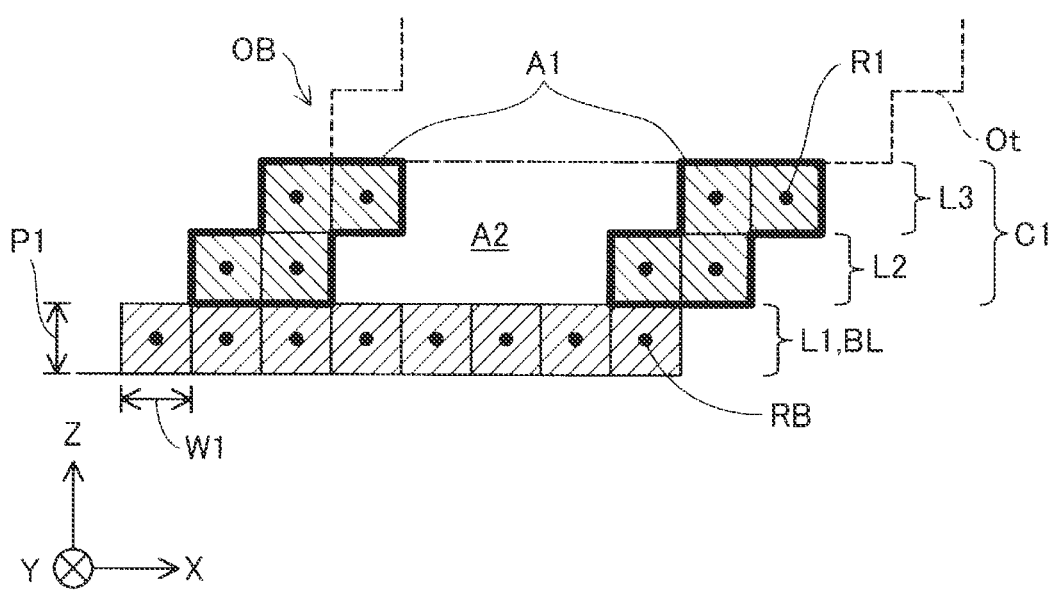
FIG. 7 is a cross-sectional view showing one example of a shape of the three-dimensional shaped article.

In FIG. 7, the shape of the bottom layer portion BL assumed to be formed when the shaping material is ejected according to each partial path RB is shown. More specifically, in FIG. 7, the shape of a cross section in the XZ plane orthogonal to a path direction of the partial path RB of the shaping material to be ejected for shaping the bottom layer portion BL is shown as a portion hatched upward to the right. In this embodiment, in Step S110, the control unit 500 determines the stacking pitch in each partial path RB as the first thickness P1, and determines the line width as a first line width W1. The first thickness P1 and the first line width W1 are the same value. Further, the first thickness P1 and the first line width W1 are the same value as the nozzle diameter Dn1 of the first nozzle 65. In other embodiments, the stacking pitch and the line width in the partial path need not be the same value. In this case, in order to maintain the shape of the shaping material to be ejected in the partial path, and to improve the shaping accuracy of the three-dimensional shaped article OB to be shaped, the stacking pitch is preferably a value equal to or less than the line width. Further, the stacking pitch or the line width and the nozzle diameter need not be the same value.

In Step S120 in FIG. 5, the control unit 500 generates data for shaping the first portion A1 of the cross-sectional body of the three-dimensional shaped article OB by stacking multiple layers having the first thickness P1. In this embodiment, the control unit 500 generates data for shaping the first portion A1 of the cross-sectional body with two layers having the first thickness P1 based on the cross-sectional body data generated in Step S100. More specifically, the control unit 500 generates data for shaping the first portion A1 by generating a partial path R1 for shaping the first portion A1 with the first thickness P1 and the first line width W1. For example, immediately after executing Step S110, the control unit 500 generates data for shaping the first portion A1 of the first cross-sectional body C1 by generating shaping data for shaping a portion corresponding to the second layer L2 and shaping data for shaping a portion corresponding to the third layer L3 in the first portion A1 of the first cross-sectional body C1.

In FIG. 7, the shape of the first cross-sectional body C1 assumed to be formed when the shaping material is ejected according to data for shaping the first portion A1 of the first cross-sectional body C1 with the first thickness P1 and the first line width W1 is shown. More specifically, in FIG. 7, the shape of a cross section in the XZ plane orthogonal to a path direction of the partial path R1 of the shaping material to be ejected for shaping the first portion A1 of the first cross-sectional body C1 is shown as a portion hatched downward to the right. Further, in FIG. 7, the first portion A1 is shown as a portion surrounded by a thick line. In this embodiment, the control unit 500 generates the partial path R1 for two rounds as the partial path for shaping the first portion A1 in the cross-sectional body.

In Step S130 in FIG. 5, the control unit 500 generates data for shaping the second portion A2 of the cross-sectional body with a layer having a second thickness P2 corresponding to a thickness of the first portion A1. More specifically, in Step S130, the control unit 500 generates data for shaping the second portion A2 by generating a partial path R2 for shaping a part of the second portion A2 with a second thickness P2 and a second line width W2. For example, in Step S120 executed prior to Step S130, as described above, when data for shaping the first portion A1 of the first cross-sectional body C1 have been generated, the control unit 500 generates data for shaping the second portion A2 of the first cross-sectional body C1 with a layer having the second thickness P2 in Step S130. In this embodiment, the second thickness P2 is a value twice the first thickness P1, and corresponds to the thickness of two layers having the first thickness P1. The second line width W2 is a value twice the first line width W1. Further, the second thickness P2 and the second line width W2 are the same value as the nozzle diameter Dn2 of the second nozzle 66.

Figure 8:
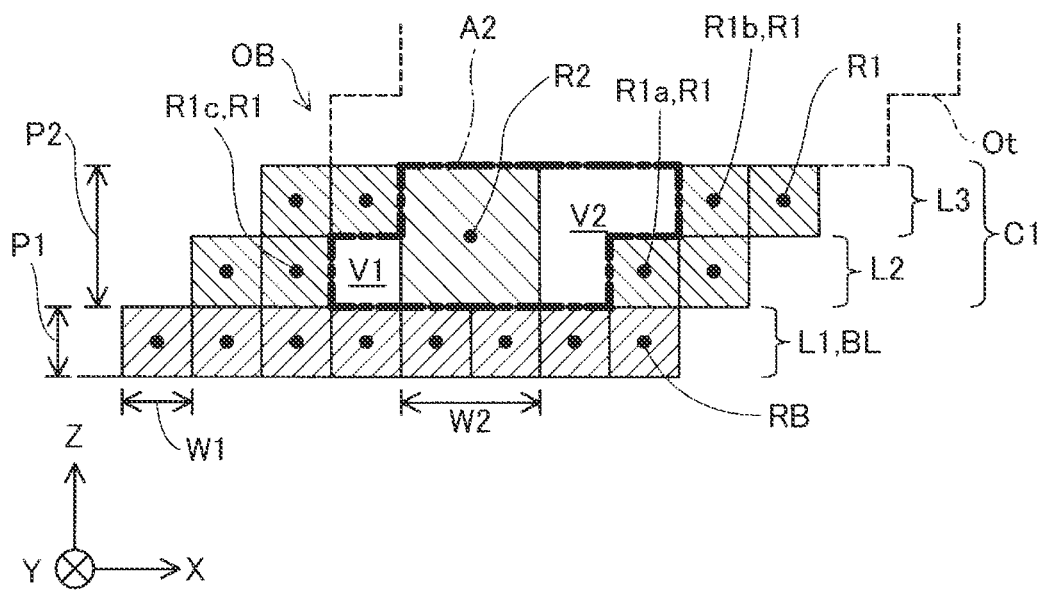
FIG. 8 is a cross-sectional view showing one example of a shape of the three-dimensional shaped article.

In FIG. 8, the shape of the first cross-sectional body C1 assumed to be formed when the shaping material is ejected according to data for shaping the second portion A2 of the first cross-sectional body C1 with the second thickness P2 and the second line width W2 is shown. More specifically, in FIG. 8, the shape of a cross section in the XZ plane orthogonal to a path direction of the partial path R2 of the shaping material to be ejected for shaping the second portion A2 of the first cross-sectional body C1 is shown as a portion hatched downward to the right. Further, in FIG. 8, the second portion A2 is shown as a portion surrounded by a thick line. In the example shown in FIG. 8, by ejecting the shaping material according to the partial path R2, a part of the second portion A2 of the first cross-sectional body C1 is shaped with one layer ranging over a portion corresponding to the second layer L2 and a portion corresponding to the third layer L3 of the first cross-sectional body C1.

By completing Step S130 in FIG. 5, first shaping data having the data for shaping the first portion A1 and the data for shaping the second portion A2 are generated. That is, in the example of the first cross-sectional body C1 described above, by completing Step S130, the first shaping data including the data for shaping the first portion A1 of the first cross-sectional body C1 with two layers having the first thickness P1 and the data for shaping the second portion A2 with one layer having the second thickness P2 are generated.

In Step S140, the control unit 500 specifies a gap portion occurring in the three-dimensional shaped article based on the first shaping data. More specifically, the control unit 500 specifies a gap portion occurring in the cross-sectional body in Step S140. In Step S140 of this embodiment, for example, a gap occurring between the shaping materials ejected in the respective partial paths R1 included in the first shaping data, between the shaping materials ejected in the respective partial paths R2, and between the shaping material ejected in the partial path R1 and the shaping material ejected in the partial path R2 is specified as the gap portion. In FIG. 8, as an example of the gap portion specified in this embodiment, a gap portion V1 and a gap portion V2, each of which is the gap occurring between the shaping material ejected in the partial path R1 and the shaping material ejected in the partial path R2, are shown. The gap portion V1 is a gap portion located in the −X direction of the partial path R2 shown in FIG. 8, and the gap portion V2 is a gap portion located in the +X direction of the partial path R2 shown in FIG. 8. Further, the step of specifying the gap portion based on the first shaping data as Step S140 is sometimes referred to as "first step".

Figure 9:
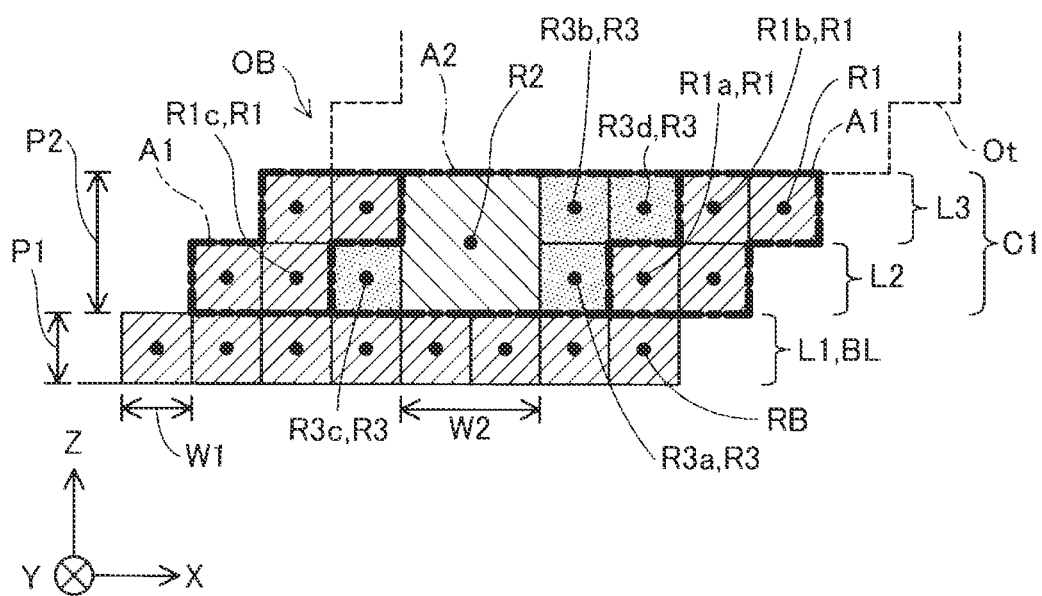
FIG. 9 is a cross-sectional view showing one example of a shape of the three-dimensional shaped article.

In Step S150, the control unit 500 generates a partial path for filling up the gap portion specified in Step 140 with the shaping material. In FIG. 9, the shape of a cross section in the XZ plane orthogonal to a path direction of the partial path R2 of the shaping material to be ejected in a partial path R3 generated in Step S150 is shown as a portion hatched with a halftone dot pattern. Further, in FIG. 9, the first portion A1 and the second portion A2 are shown as portions surrounded by a thick line. In this embodiment, the control unit 500 generates the partial path R3 for ejecting the shaping material with a width smaller than the second line width W2 and with a third thickness smaller than the second thickness P2 realized by the data for shaping the second portion A2 to the gap portion V1 and the gap portion V2 shown in FIG. 8 in Step S150. That is, it can also be said, in other words, that the control unit 500 generates data for shaping a layer having the third thickness by ejecting the shaping material with a width smaller than the second line width W2 and with the third thickness to the gap portion in Step S150.

Specifically, in Step S150, the control unit 500 generates a partial path R3c in the gap portion V1 and generates a partial path R3a, a partial path R3b, and a partial path R3d in the gap portion V2 as shown in FIGS. 8 and 9 as the partial path R3. The partial path R3a and the partial path R3c are each a partial path for shaping a portion corresponding to the second layer L2 in the first cross-sectional body C1, and the partial path R3b and the partial path R3d are each a partial path for shaping a portion corresponding to the third layer L3. In this embodiment, the line width of the partial path R3 is equal to the first line width W1, and the third thickness is equal to the first thickness P1.

In this manner, in this embodiment, the control unit 500 changes the first shaping data so as to fill up the gap portion by generating the additional partial path R3 in the gap portion, thereby generating the second shaping data from the first shaping data. That is, the second shaping data of this embodiment are shaping data in which data for filling up the gap portion are added to the first shaping data. Note that the step of generating the second shaping data by changing the first shaping data so as to fill up the gap portion is sometimes referred to as "second step". Further, a partial path included in data for shaping a layer having the third thickness smaller than the second thickness P2 as the partial path R3 of this embodiment is sometimes referred to as "small-pitch path".

In Step S160 in FIG. 5, the control unit 500 determines whether or not the process from Step S120 to Step S150 is completed for all cross-sectional bodies. When it is determined that the process is not completed in Step S160, the control unit 500 returns the process to Step S120.

In Step S160, when it is determined that the process from Step S120 to Step S150 is completed for all cross-sectional bodies, the control unit 500 generates shaping data of the top layer portion that are shaping data for shaping the top layer portion TL in Step S170. In Step S170, the control unit 500 generates the shaping data of the top layer portion based on the shape data of the top layer portion in the same manner as the shaping data of the bottom layer portion are generated in Step S110.

In Step S180, the control unit 500 shapes the three-dimensional shaped article OB by ejecting the shaping material from the ejection section 60 and stacking layers. In this embodiment, in Step S180, the control unit 500 ejects the shaping material from the first nozzle 65 and the second nozzle 66 according to the shaping data of the bottom layer portion, the second shaping data, and the shaping data of the top layer portion, thereby shaping the three-dimensional shaped article OB. The step of shaping the three-dimensional shaped article OB by ejecting the shaping material according to the second shaping data as Step S180 is sometimes referred to as "third step".

In Step S180, for example, when the bottom layer portion BL and the first cross-sectional body C1 of the three-dimensional shaped article OB are shaped, the control unit 500 first moves the first nozzle 65 and ejects the shaping material from the first nozzle 65 according to the partial path RB shown in FIG. 9, thereby shaping the bottom layer portion BL. Subsequently, the control unit 500 ejects the shaping material from the first nozzle 65 according to the partial path R1 for shaping a portion corresponding to the second layer L2 in the first portion A1 of the first cross-sectional body C1. Subsequently, the control unit 500 ejects the shaping material from the first nozzle 65 according to the partial path R3a and the partial path R3c for shaping a portion corresponding to the second layer L2 of the first cross-sectional body C1. Subsequently, the control unit 500 moves the second nozzle 66 and ejects the shaping material from the second nozzle 66 according to the partial path R2 for shaping the second portion A2 of the first cross-sectional body C1. Subsequently, the control unit 500 ejects the shaping material from the first nozzle 65 according to the partial path R1 for shaping a portion corresponding to the third layer L3 of the first cross-sectional body C1. Further, the control unit 500 ejects the shaping material from the first nozzle 65 according to the partial path R3b and the partial path R3c for shaping a portion corresponding to the third layer L3 of the first cross-sectional body C1. By doing this, the cross-sectional body C1 is shaped. In this manner, the control unit 500 shapes the three-dimensional shaped article OB by repeating stacking of the shaping material according to the second shaping data.

The method for producing the three-dimensional shaped article OB of this embodiment described above includes the first step of specifying the gap portion occurring inside the three-dimensional shaped article based on the first shaping data having data for shaping the first portion A1 of the three-dimensional shaped article by stacking multiple layers having the first thickness P1 and data for shaping the second portion A2 of the cross-sectional body with a layer having the second thickness P2, the second step of generating the second shaping data from the first shaping data by changing the first shaping data so as to fill up the gap portion when the gap portion is specified, and the third step of shaping the three-dimensional shaped article by controlling the control unit 500 according to the second shaping data. More specifically, this production method includes the first step of specifying the gap portion occurring in the cross-sectional body based on the first shaping data having data for shaping the first portion A1 of the cross-sectional body by stacking multiple layers having the first thickness P1 and data for shaping the second portion A2 of the cross-sectional body with a layer having the second thickness P2, the second step, and the third step of shaping the three-dimensional shaped article OB by controlling the control unit 500 according to the second shaping data. According to such a configuration, the second portion A2 is shaped with a layer having a thickness corresponding to that of the first portion A1, and therefore, the strength of the three-dimensional shaped article OB in the Z direction is improved. Further, the second shaping data are generated by changing the first shaping data so as to fill up the gap portion, and therefore, the occurrence of a void in the three-dimensional shaped article OB is suppressed. Accordingly, the strength of the three-dimensional shaped article OB is improved.

Further, in this embodiment, in the second step, the second shaping data are generated by generating data for ejecting the shaping material with a line width smaller than a line width to be realized by the data for shaping the second portion A2 to the gap portion. According to this, the gap portion with a smaller width can be filled up by the data generated in the second step, and therefore, the gap portion can be effectively filled up. Therefore, the occurrence of a void in the three-dimensional shaped article OB can be further suppressed.

Further, in this embodiment, in the second step, the second shaping data are generated by generating data for shaping the layer having the third thickness smaller than the second thickness P2 in the gap portion. According to this, the gap portion with a smaller thickness can be filled up by the data generated in the second step, and therefore, the gap portion can be effectively filled up. Therefore, the occurrence of a void in the three-dimensional shaped article OB can be further suppressed.

Further, in this embodiment, in the third step, the three-dimensional shaped article OB is shaped by ejecting the shaping material from the first nozzle 65 and the second nozzle 66 according to the second shaping data. According to this, the thickness of the layer to be shaped can be simply changed by switching the nozzle from which the shaping material is ejected, and therefore, the three-dimensional shaped article OB can be shaped by a simpler method. More specifically, for example, when the first portion A1 is shaped by stacking layers having the first thickness P1, the shaping material can be ejected from the first nozzle 65 having a smaller nozzle diameter Dn1, and when the second portion A2 is shaped with a layer having the second thickness P2, the shaping material can be ejected from the second nozzle 66 having a larger nozzle diameter Dn2, and therefore, the three-dimensional shaped article OB can be shaped by a simpler method.

Here, the material of the three-dimensional shaped article to be used in the above-mentioned three-dimensional shaping apparatus 100 will be described. In the three-dimensional shaping apparatus 100, for example, a three-dimensional shaped article can be shaped using any of various materials such as a material having thermoplasticity, a metal material, and a ceramic material as a main material. Here, the "main material" means a material serving as a main component for forming the shape of the three-dimensional shaped article and refers to a material whose content ratio is 50 wt % or more in the three-dimensional shaped article. In the above-mentioned shaping material, a material obtained by melting such a main material singly, and a material formed into a paste by melting some components contained together with the main material are included.

When a material having thermoplasticity is used as the main material, the shaping material is formed by plasticizing the material in the plasticizing section 30.

As the material having thermoplasticity, for example, the following thermoplastic resin materials can be used.

Examples of Thermoplastic Resin Material general-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polyether ether ketone (PEEK), polycarbonate (PC), modified polyphenylene ether, polybutylene terephthalate, and polyethylene terephthalate, and engineering plastics such as polysulfone, polyethersulfone, polyphenylene sulfide, polyarylate, polyimide, polyamideimide, polyetherimide, and polyether ether ketone In the material having thermoplasticity, a pigment, a metal, a ceramic, or other than these, an additive such as a wax, a flame retardant, an antioxidant, or a heat stabilizer, or the like may be mixed. The material having thermoplasticity is plasticized and transformed into a molten state by the rotation of the screw 40 and heating by the heater 58 in the plasticizing section 30.

The material having thermoplasticity is desirably injected from the ejection section 60 in a completely molten state by being heated to a temperature equal to or higher than the glass transition point thereof. For example, when an ABS resin is used, the temperature thereof when it is ejected from the ejection section 60 is desirably about 200° C.

In the three-dimensional shaping apparatus 100, in place of the above-mentioned material having thermoplasticity, for example, the following metal material may be used as the main material. In this case, it is desirable that a component that melts when forming the shaping material is mixed in a powder material obtained by pulverizing the following metal material into a powder, and the resulting material is fed to the plasticizing section 30 as a material MR.

Examples of Metal Material single metals of magnesium (Mg), iron (Fe), cobalt (Co), chromium (Cr), aluminum (Al), titanium (Ti), copper (Cu), and nickel (Ni), or alloys containing one or more of these metals Examples of Alloy a maraging steel, a stainless steel, cobalt-chromium-molybdenum, a titanium alloy, a nickel alloy, an aluminum alloy, a cobalt alloy, and a cobalt-chromium alloy In the three-dimensional shaping apparatus 100, in place of the above-mentioned metal material, a ceramic material can be used as the main material. As the ceramic material, for example, an oxide ceramic such as silicon dioxide, titanium dioxide, aluminum oxide, or zirconium oxide, a non-oxide ceramic such as aluminum nitride, or the like can be used. When a metal material or a ceramic material as described above is used as the main material, the shaping material ejected onto the stage 300 may be cured by sintering.

The powder material of the metal material or the ceramic material to be fed to the material supply section 20 as the material MR may be a mixed material obtained by mixing multiple types of single metal powders or alloy powders or ceramic material powders. Further, the powder material of the metal material or the ceramic material may be coated with, for example, a thermoplastic resin as exemplified above or any other thermoplastic resin. In this case, the material may be configured to exhibit fluidity by melting the thermoplastic resin in the plasticizing section 30.

To the powder material of the metal material or the ceramic material to be fed to the material supply section 20 as the material MR, for example, a solvent as described below can also be added. As the solvent, one type or a combination of two or more types selected from the following solvents can be used.

Examples of Solvent water; (poly)alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl n-butyl ketone, diisopropyl ketone, and acetyl acetone; alcohols such as ethanol, propanol, and butanol; tetra-alkyl ammonium acetates; sulfoxide-based solvents such as dimethyl sulfoxide and diethyl sulfoxide; pyridine-based solvents such as pyridine, γ-picoline, and 2,6-lutidine; tetra-alkyl ammonium acetates (for example, tetra-butyl ammonium acetate, etc.); ionic liquids such as butyl carbitol acetate, and the like In addition thereto, for example, a binder as described below can also be added to the powder material of the metal material or the ceramic material to be fed to the material supply section 20 as the material MR.

Examples of Binder an acrylic resin, an epoxy resin, a silicone resin, a cellulosic resin, or another synthetic resin, or PLA (polylactic acid), PA (polyamide), PPS (polyphenylene sulfide), PEEK (polyether ether ketone), or other thermoplastic resins

B. Second Embodiment

Figure 10:
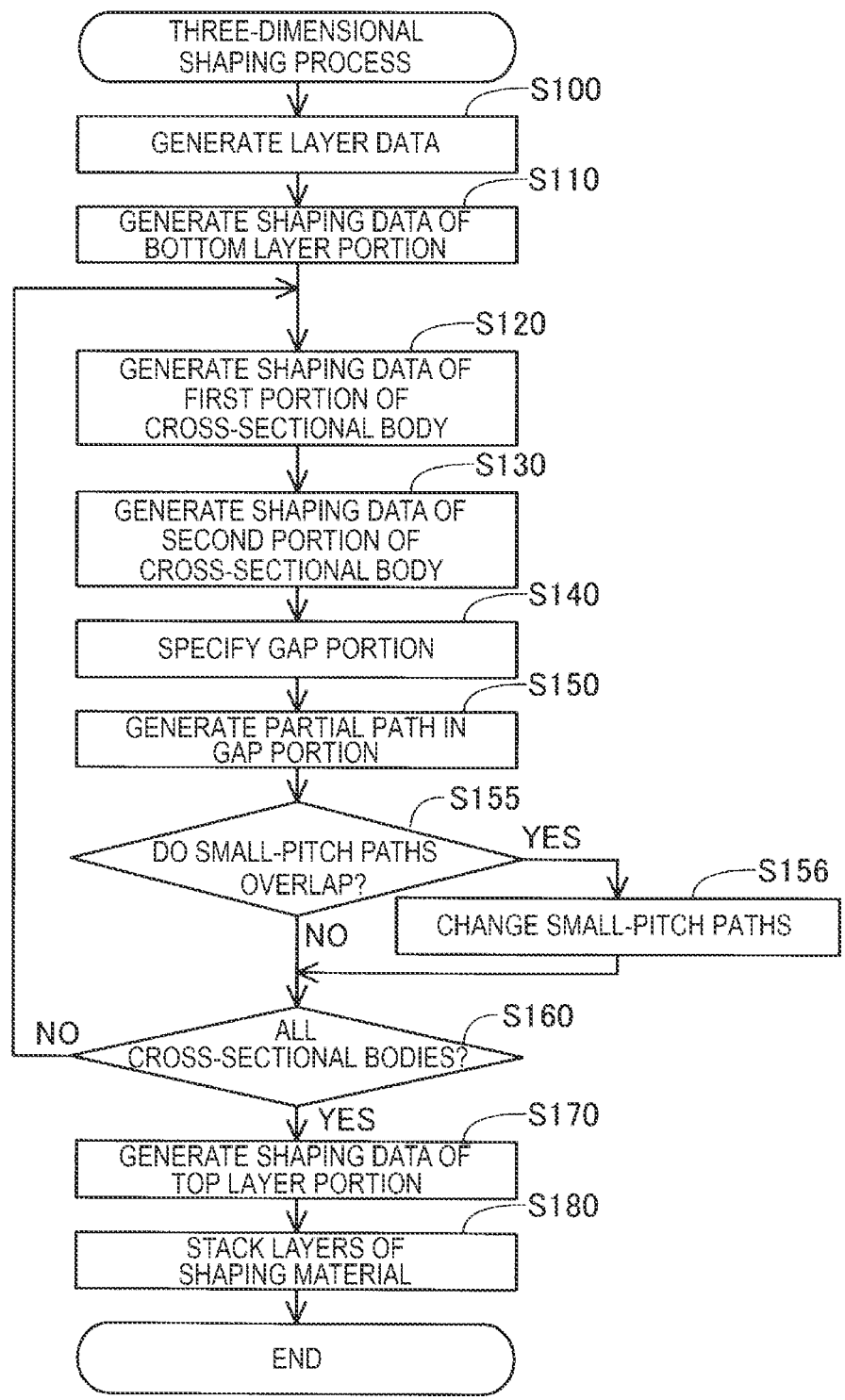
FIG. 10 is a process chart showing a three-dimensional shaping process in a second embodiment.

FIG. 10 is a process chart showing a three-dimensional shaping process in a second embodiment. In this embodiment, in the second step of the shaping process, unlike the first embodiment, when multiple layers having the third thickness overlap with one another in the stacking direction, the control unit 500 generates the second shaping data by changing the data for shaping the multiple overlapping layers having the third thickness to data for shaping a layer having a fourth thickness corresponding to a thickness of the multiple overlapping layers having the third thickness. Portions that are not particularly described in the configuration of the three-dimensional shaping apparatus 100 of this embodiment are the same as those of the first embodiment. Further, in the respective steps in FIG. 10, the same steps as the respective steps of the shaping process shown in FIG. 5 are denoted by the same reference numerals as the respective steps in FIG. 5.

In Step S155, the control unit 500 determines whether or not multiple small-pitch paths overlap with one another in the Z direction. When it is determined that multiple small-pitch paths overlap with one another in the Z direction in Step S155, the control unit 500 changes the multiple overlapping small-pitch paths to one partial path for ejecting the shaping material with the fourth thickness corresponding to the thickness of the shaping material to be ejected in the multiple overlapping small-pitch paths in Step S156. For example, in Step S150 executed immediately before Step S155, in the same manner as in the first embodiment, when the respective partial paths R3 shown in FIG. 9 are generated, in the partial paths R3, two partial paths: the partial path R3a and the partial path R3b located in the +X direction of the partial path R2 overlap with each other. In this case, the control unit 500 determines that the multiple small-pitch paths overlap with one another in the Z direction in Step S155. The state where the multiple small-pitch paths overlap with one another in the Z direction can also be paraphrased as a state where multiple layers having the third thickness overlap with one another in the stacking direction.

Figure 11:
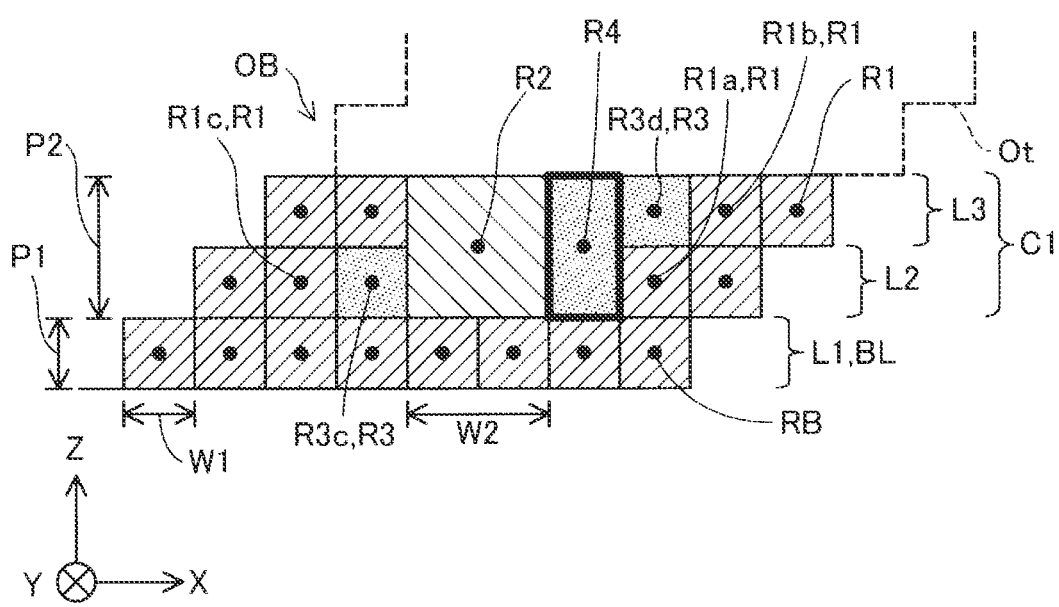
FIG. 11 is a cross-sectional view showing one example of a shape of a three-dimensional shaped article in the second embodiment.

FIG. 11 is a cross-sectional view showing one example of a shape of the three-dimensional shaped article OB to be shaped in the three-dimensional shaping process of the second embodiment. In FIG. 11, a state where the partial path R3a and the partial path R3b shown in FIG. 9 are changed to one partial path R4 is shown. In FIG. 11, the partial path R4 is indicated by a thick line. The fourth thickness of this embodiment is equal to the second thickness P2 and corresponds to a thickness when two layers having the third thickness equal to the first thickness P1 overlap with each other in the Z direction. It is preferred that in Step S180, the control unit 500 ejects the shaping material from the second nozzle 66 in the partial path R4.

According also to the method for producing the three-dimensional shaped article OB of this embodiment described above, the strength of the three-dimensional shaped article OB in the Z direction is improved, and the occurrence of a void in the three-dimensional shaped article OB is suppressed. In particular, in this embodiment, in the second step, when multiple layers having the third thickness overlap with one another in the Z direction, the control unit 500 generates the second shaping data by changing the data for shaping the multiple overlapping layers having the third thickness to data for shaping a layer having the fourth thickness corresponding to a thickness of the multiple overlapping layers having the third thickness. Therefore, the occurrence of a void in the three-dimensional shaped article OB is effectively suppressed. In addition, the gap portion is filled up with the layer having the fourth thickness, and therefore, the strength of the three-dimensional shaped article OB in the Z direction is further improved.

C. Third Embodiment

Figure 12:
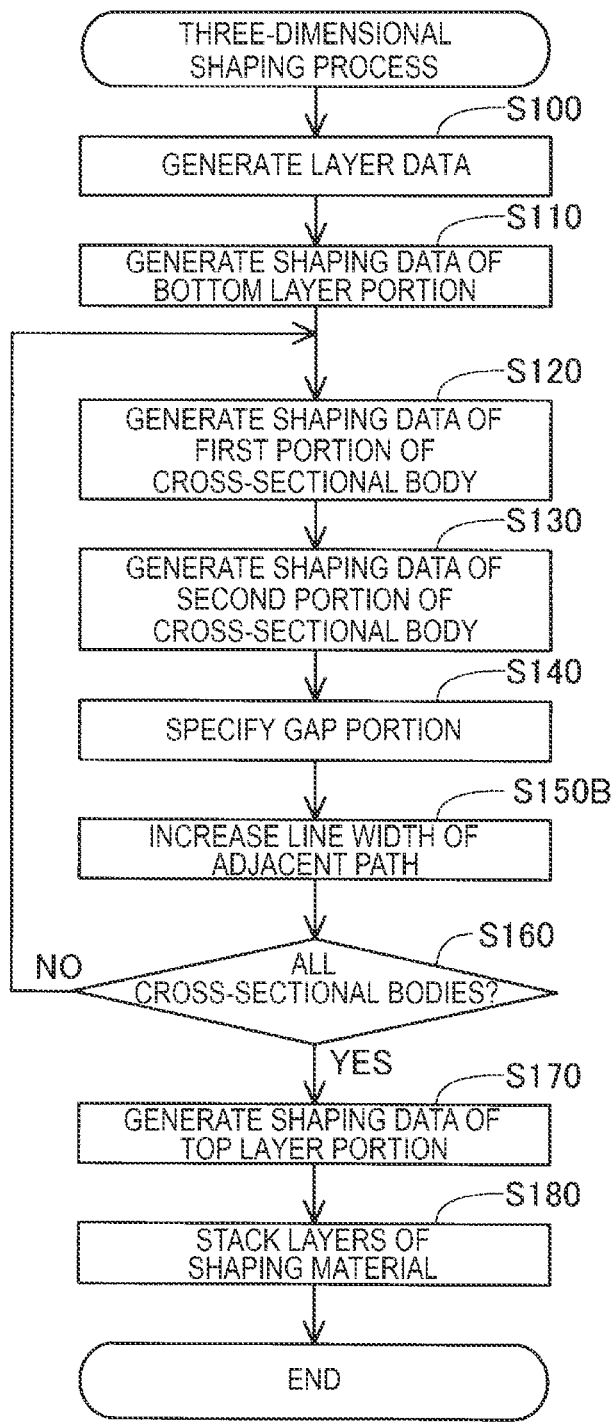
FIG. 12 is a process chart showing a three-dimensional shaping process in a third embodiment.

FIG. 12 is a process chart showing a three-dimensional shaping process in a third embodiment. In this embodiment, in the second step of the shaping process, unlike the first embodiment, the control unit 500 generates the second shaping data by generating data for shaping while increasing the line width in the partial path adjacent to the gap portion. Portions that are not particularly described in the configuration of the three-dimensional shaping apparatus 100 of this embodiment are the same as those of the first embodiment. Further, in the respective steps in FIG. 12, the same steps as the respective steps of the shaping process shown in FIG. 5 are denoted by the same reference numerals as the respective steps in FIG. 5.

In Step S150B, the control unit 500 increases the line width in the partial path adjacent to the gap portion specified in Step S140. The state where a partial path is adjacent to the gap portion refers to a state where the partial path and the gap portion having a height equal to or more than the stacking pitch of the partial path are adjacent to each other. For example, in Step S140 executed immediately before Step S150B, when the gap portion V1 and the gap portion V2 shown in FIG. 8 are specified as the gap portion, to the gap portion V2, the partial path R2, and a partial path R1a and a partial path R1b, both of which are located in the +X direction of the gap portion V2 are adjacent in the same manner as in the first embodiment. Further, to the gap portion V1, the partial path R2 is not adjacent, but a partial path R1c located in the −X direction of the gap portion V1 is adjacent.

Further, in this embodiment, when the first partial path and the second partial path located more inside the three-dimensional shaped article OB than the first partial path are adjacent to the gap portion, the control unit 500 generates data for shaping while increasing the line width in the second partial path without changing the line width in the first partial path in Step S150B. In the example shown in FIG. 8, to the gap portion V2, the partial path R1a, the partial path R1b, and the partial path R2 are adjacent as described above. In this embodiment, the partial path R1a and the partial path R1b are located between the partial path R2 and the outline Ot, and therefore, the partial path R1a and the partial path R1b are the first partial path, and the partial path R2 is the second partial path. Therefore, the control unit 500 increases the line width of the partial path R2 in Step S150B.

Further, to the gap portion V1, only the partial path R1c is adjacent, and therefore, the control unit 500 increases the line width of the partial path R1c in Step S150B.

Figure 13:
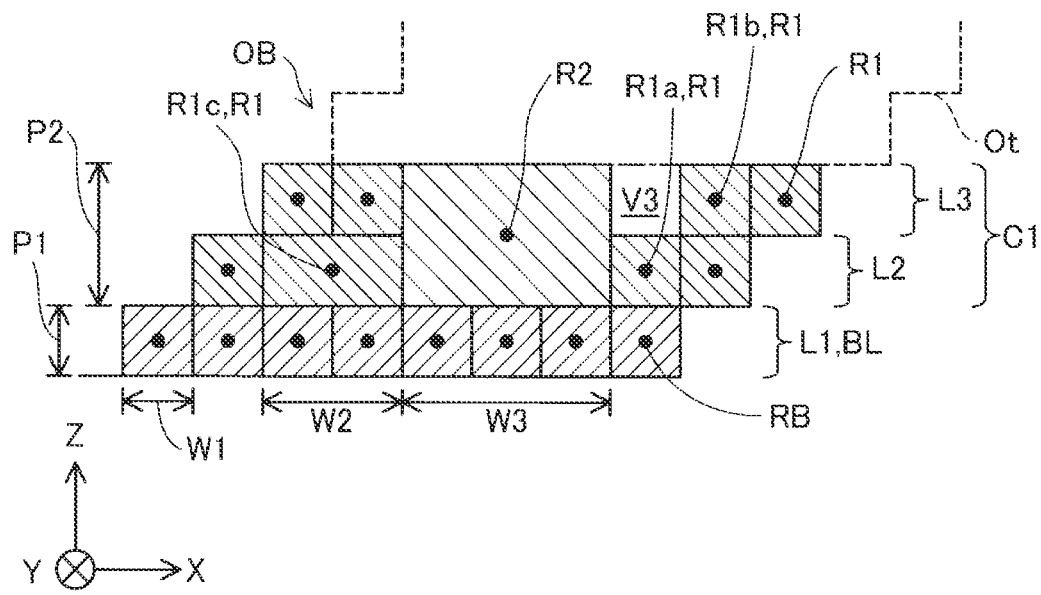
FIG. 13 is a cross-sectional view showing one example of a shape of a three-dimensional shaped article in the third embodiment.
Figure 14:
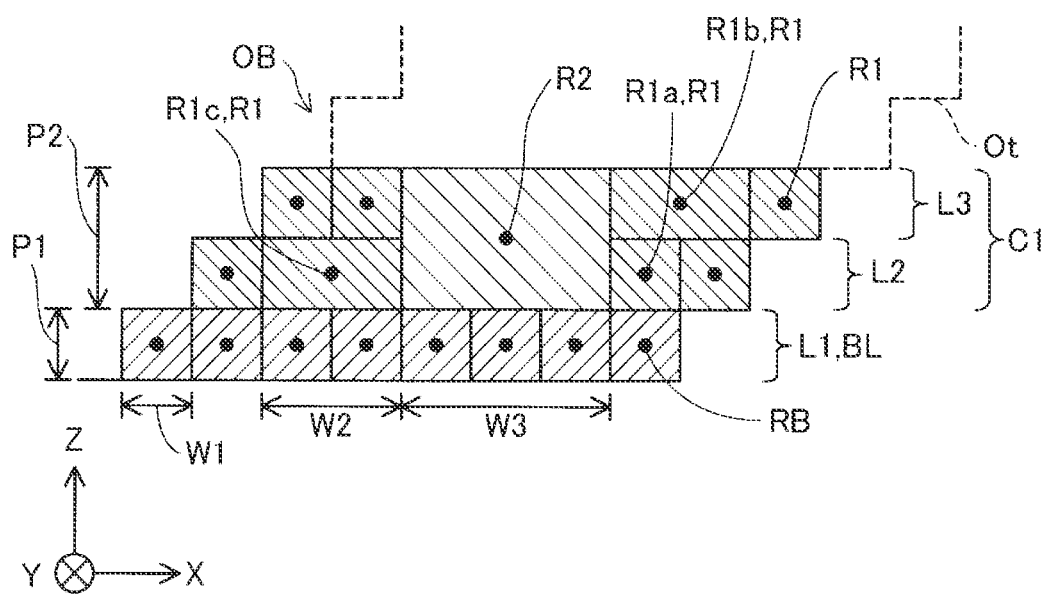
FIG. 14 is a cross-sectional view showing one example of a shape of the three-dimensional shaped article in the third embodiment.

FIGS. 13 and 14 are each a cross-sectional view showing one example of a shape of the three-dimensional shaped article OB to be shaped in the three-dimensional shaping process of the third embodiment. In FIG. 13, a state where the line width of the partial path R1c and the line width of the partial path R2 shown in FIG. 8 are changed is shown. In FIG. 13, the line width of the partial path R1c is changed from the original first line width W1 to the second line width W2. Further, the line width of the partial path R2 is changed to a third line width larger than the original second line width W2, and the gap portion V2 is shrunk and a gap portion V3 occurs. To this gap portion V3, only the partial path R1b is adjacent, and therefore, the control unit 500 further changes the line width of the partial path R1b from the original first line width W1 to the second line width W2 as shown in FIG. 14.

According also to the method for producing the three-dimensional shaped article OB of this embodiment described above, the strength of the three-dimensional shaped article OB in the Z direction is improved, and the occurrence of a void in the three-dimensional shaped article OB is suppressed. In particular, in this embodiment, in the second step, the control unit 500 generates the second shaping data by generating data for shaping while increasing the line width in the partial path adjacent to the gap portion. According to such a configuration, the gap portion can be filled up without increasing the number of partial paths. Therefore, the occurrence of a void in the three-dimensional shaped article OB is suppressed without increasing the number of partial paths.

Further, in this embodiment, in the second step, when the first partial path and the second partial path located more inside the three-dimensional shaped article OB than the first partial path are adjacent to each other, the control unit 500 generates the second shaping data by generating data for shaping while increasing the line width in the second partial path without changing the line width in the first partial path. Therefore, the gap portion can be filled up while further suppressing the effect on the appearance of the three-dimensional shaped article OB.

In other embodiments, the control unit 500 may fill up the gap portion by executing, for example, the generation of the partial path R3 as in the first embodiment or the second embodiment, and the changing of the line width of the partial path adjacent to the gap portion as in the third embodiment in combination. For example, when a gap portion still occurs in the cross-sectional body after executing the process of generating the partial path R3, the control unit 500 may further fill up the gap portion by increasing the line width of the partial path adjacent to the gap portion. In this case, the control unit 500 may increase the line width of the partial path R3. Further, for example, when the first partial path and the second partial path located more inside the three-dimensional shaped article OB than the first partial path are adjacent to each other, the control unit 500 may increase the line width in the second partial path in the same manner as in the third embodiment. The first partial path or the second partial path in this case may be the partial path R3.

Figure 15:
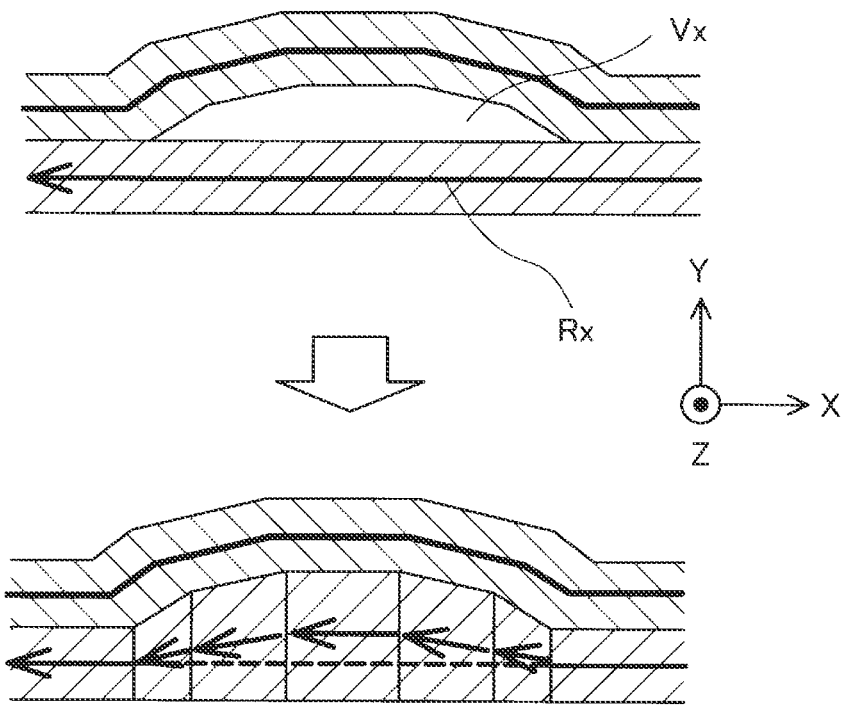
FIG. 15 is a view showing an example of a gap portion in another embodiment.

D. Other Embodiments (D-1) FIG. 15 is a view showing an example of a gap portion Vx in another embodiment. In FIG. 15, unlike FIG. 8 or FIG. 13, a state where the gap portion Vx is seen from above is shown. In the above embodiment, the shape of the gap portion may be such that the width thereof changes as that of a gap portion Vx in a fan shape shown in the upper part of FIG. 15. When the gap portion Vx whose width changes in this manner is specified in the first step of the three-dimensional shaping process, the control unit 500 may, for example, generate the second shaping data by generating data for shaping while changing the line width of the partial path adjacent to the gap portion Vx according to the width of the gap portion in the second step. Specifically, the control unit 500 divides a partial path Rx adjacent to the gap portion Vx into multiple partial paths and increases the line width of each of the divided partial paths so as to change according to the change in the width of the gap portion as shown in the lower part of FIG. 15. According to this, the control unit 500 can efficiently and accurately fill up the gap portion Vx. Further, the control unit 500 can more accurately fill up the gap portion Vx by changing each of the partial paths generated by division to a path passing through the center of the line width of each of the partial paths as indicated by a solid line arrow in the lower part of FIG. 15. In addition, the control unit 500 may fill up the gap portion Vx by newly generating a partial path whose line width changes according to the change in the width of the gap portion Vx in the gap portion Vx in the second step.

Figure 16:
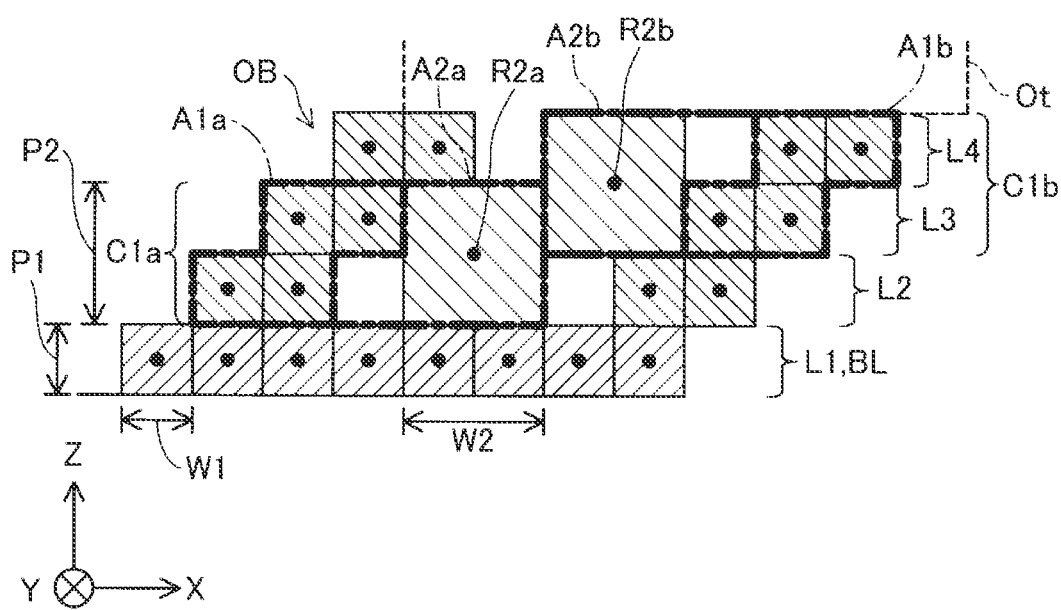
FIG. 16 is a cross-sectional view showing one example of a shape of a three-dimensional shaped article in another embodiment.

(D-2) In the above embodiment, the control unit 500 shapes the first portion A1 of the cross-sectional body by stacking two layers having the first thickness P1. On the other hand, the control unit 500 may shape the first portion A1 by stacking three or more layers having the first thickness P1. Further, FIG. 16 is a view showing one example of a shape of the three-dimensional shaped article OB to be shaped in a three-dimensional shaping process of another embodiment. In FIG. 16, a first portion A1a and a second portion A2a of a stacked body C1a, and a first portion A1b and a second portion A2b of a stacked body C1b are indicated by a thick line. As shown in the example in FIG. 16, multiple cross-sectional bodies may be located so as to overlap with one another in the horizontal direction. In the example in FIG. 16, the second portion A2a of the stacked body C1a is shaped as a layer ranging over the second layer L2 and the third layer L3 from the shaping material ejected in a partial path R2a. Further, the second portion A2b of the stacked body C1b is shaped as a layer ranging over the third layer L3 and the fourth layer L4 from the shaping material ejected in a partial path R2b. According to this, the strength of the three-dimensional shaped article OB in the Z direction is further improved.

(D-3) In the above embodiment, the first shaping data may have shaping data other than the data for shaping the first portion A1 by stacking layers having the first thickness P1 and the data for shaping the second portion A2 with a layer having the second thickness P2 for shaping the cross-sectional body. For example, the first shaping data may have other shaping data for shaping a portion that is not shaped by the data for shaping the second portion A2 with a layer having the second thickness P2 in the second portion A2 of the cross-sectional body. In this case, the control unit 500 can, for example, specify a gap occurring between the shaping materials ejected between the respective partial paths included in the first shaping data including a partial path included in the other shaping data as a gap portion in the first step. Further, in this case, the control unit 500 may, for example, generate the second shaping data by changing the line width of the partial path included in the other shaping data in the second step.

(D-4) In the above embodiment, the control unit 500 determines the second line width W2 as a value twice the first line width W1. On the other hand, the control unit 500 need not determine the second line width W2 as a value twice the first line width W1, and for example, may determine the second line width W2 as a value smaller or larger than the value twice the first line width W1.

(D-5) In the above embodiment, the control unit 500 generates the second shaping data by generating data for ejecting the shaping material with a line width smaller than the second line width W2 in the gap portion in the second step. On the other hand, the control unit 500 may generate the second shaping data by generating data for ejecting the shaping material with a line width equal to or larger than the second line width W2 in the gap portion.

(D-6) In the above embodiment, the control unit 500 generates the second shaping data by generating data for shaping a layer having the third thickness smaller than the second thickness P2 in the gap portion in the second step. On the other hand, the control unit 500 may generate the second shaping data by generating data for shaping a layer having a thickness equal to or larger than the second thickness P2 in the gap portion.

(D-7) In the above embodiment, in the second step, when the first partial path and the second partial path are adjacent to the gap portion, the control unit 500 generates the second shaping data by generating data for shaping while increasing the line width in the second partial path without changing the line width in the first partial path. On the other hand, in the second step, even when the first partial path and the second partial path are adjacent to the gap portion, the control unit 500 may generate the second shaping data by generating data for shaping while increasing the line width in the first partial path instead of in the second partial path.

(D-8) In the above embodiment, the ejection section 60 includes the first nozzle 65 and the second nozzle 66. On the other hand, the ejection section 60 may include three or more nozzles. Further, the ejection section 60 may include only one nozzle. In the configuration in which the ejection section 60 includes only one nozzle, for example, the stacking pitch and the line width are adjusted by adjusting the gap Gp in the partial path, the moving speed of the nozzle with respect to the stage 300, the amount of the shaping material to be ejected from the nozzle per unit time, or the like. In this case, the control unit 500, for example, may adjust the amount of the shaping material to be ejected from the nozzle by controlling a mechanism capable of adjusting the amount of the shaping material flowing in the flow channel in the ejection section 60 as the valve mechanism 70, or may adjust the amount of the shaping material to be ejected from the nozzle by adjusting the rotational speed of the screw 40.

(D-9) In the above embodiment, the control unit 500 shapes the bottom layer portion BL and the top layer portion TL with one layer having the first thickness P1. On the other hand, the bottom layer portion BL or the top layer portion TL may be shaped with a layer having a thickness different from the first thickness P1. Further, the bottom layer portion BL or the top layer portion TL may be shaped with multiple layers. Further, the control unit 500 may shape the bottom layer portion BL and the top layer portion TL by ejecting the shaping material with different stacking pitches or line widths, respectively. When the three-dimensional shaped article OB does not have the bottom layer portion BL or the top layer portion TL, the control unit 500 need not generate the shaping data of the bottom layer portion or the shaping data of the top layer portion. In this case, the control unit 500 can shape the three-dimensional shaped article OB according only to the second shaping data in the third step.

(D-10) In the above embodiment, the control unit 500 generates the cross-sectional body data based on the layer data. On the other hand, the control unit 500 need not generate the cross-sectional body data based on the layer data. For example, the control unit 500 may divide the three-dimensional shaped article OB for every predetermined thickness, and then divide the divided portions into multiple layers having the first thickness P1. Further, the control unit 500 may divide the three-dimensional shaped article OB for every predetermined thickness, and then specify the first portion A1 and the second portion A2 in the divided portions, and divide only the first portion A1 into multiple layers having the first thickness P1.

(D-11) In the above embodiment, the first portion A1 is a portion corresponding to the outline region of the cross-sectional body, and the second portion A2 is a portion corresponding to the inner region of the cross-sectional body. On the other hand, the first portion A1 need not be a portion corresponding to the outline region, and the second portion A2 need not be a portion corresponding to the inner region. For example, the first portion A1 may be a portion corresponding to the inner region, and the second portion A2 may be a portion corresponding to the outline region. In this case, the control unit 500, for example, can specify a gap occurring between the shaping material ejected in the partial path and the outline Ot of the three-dimensional shaped article OB as the gap portion in addition to the gap occurring between the shaping materials ejected in the partial paths included between the first shaping data.

(D-12) In the above embodiment, the control unit 500 generates the first shaping data. On the other hand, the control unit 500 need not generate the first shaping data. For example, the control unit 500 may acquire the first shaping data generated by an external computer or the like from the external computer or the like.

(D-13) In the above embodiment, the shaping section 200 plasticizes the material by the flat screw. On the other hand, the shaping section 200 may plasticize the material by, for example, rotating an in-line screw. Further, the shaping section 200 may be constituted as a head that plasticizes a filamentous material and ejects the plasticized material.

E. Other Aspects

The present disclosure is not limited to the above-mentioned embodiments, but can be realized in various aspects without departing from the gist thereof. For example, the present disclosure can also be realized in the following aspects. The technical features in the above-mentioned embodiments corresponding to technical features in the respective aspects described below may be appropriately replaced or combined for solving part or all of the problems of the present disclosure or achieving part or all of the effects of the present disclosure. Further, the technical features may be appropriately deleted unless they are described as essential features in the present specification.

(1) According to the first aspect of the present disclosure, a three-dimensional shaped article production method for producing a three-dimensional shaped article by ejecting a shaping material to a stage and stacking layers according to a path including multiple partial paths is provided. The production method includes a first step of specifying a gap portion occurring inside the three-dimensional shaped article based on first shaping data having data for shaping a first portion that is a part of the three-dimensional shaped article by stacking layers having a first thickness and data for shaping a second portion that is apart of the three-dimensional shaped article and is adjacent to the first portion in a direction orthogonal to a stacking direction of the layers with a layer having a second thickness corresponding to a thickness of the first portion, a second step of generating second shaping data from the first shaping data by changing the first shaping data so as to fill up the gap portion when the gap portion is specified, and a third step of shaping the three-dimensional shaped article by ejecting the shaping material according to the second shaping data.

According to such an aspect, the second portion is shaped with a layer having a thickness corresponding to that of the first portion, and therefore, the strength of the three-dimensional shaped article in the stacking direction is improved. Further, the second shaping data are generated by changing the first shaping data so as to fill up the gap portion, and therefore, the occurrence of a void in the three-dimensional shaped article is suppressed. Accordingly, the strength of the three-dimensional shaped article is improved.

(2) In the above aspect, in the second step, the second shaping data may be generated by generating data for ejecting the shaping material with a line width smaller than a line width to be realized by the data for shaping the second portion with the layer having the second thickness. According to such an aspect, by the data generated in the second step, a gap portion with a smaller width can be filled up, and therefore, the gap portion can be effectively filled up. Accordingly, the occurrence of a void in the three-dimensional shaped article can be further suppressed.

(3) In the above aspect, in the second step, the second shaping data may be generated by generating data for shaping a layer having a third thickness smaller than the second thickness in the gap portion. According to such an aspect, by the data generated in the second step, a gap portion with a smaller thickness can be filled up, and therefore, the gap portion can be effectively filled up. Accordingly, the occurrence of a void in the three-dimensional shaped article can be further suppressed.

(4) In the above aspect, in the second step, when multiple layers having the third thickness overlap with one another in the stacking direction, the second shaping data may be generated by changing the data for shaping the multiple overlapping layers having the third thickness to data for shaping a layer having a fourth thickness corresponding to a thickness of the multiple overlapping layers having the third thickness. According to such an aspect, the occurrence of a void in the three-dimensional shaped article is effectively suppressed. Further, the gap portion is filled up with the layer having the fourth thickness, and therefore, the strength of the three-dimensional shaped article in the stacking direction is further improved.

(5) In the above aspect, in the second step, the second shaping data may be generated by generating data for shaping while increasing the line width in the partial path adjacent to the gap portion. According to such an aspect, the gap portion can be filled up without increasing the number of partial paths. Therefore, the occurrence of a void in the three-dimensional shaped article can be suppressed without increasing the number of partial paths.

(6) In the above aspect, in the second step, when a first partial path and a second partial path located more inside the three-dimensional shaped article than the first partial path are adjacent to the gap portion, the second shaping data may be generated by generating data for shaping while increasing the line width in the second partial path without changing the line width in the first partial path. According to such an aspect, the gap portion can be filled up while further suppressing the effect on the appearance of the three-dimensional shaped article.

(7) In the above aspect, in the second step, the second shaping data may be generated by generating data for shaping while changing the line width of the partial path adjacent to the gap portion according to a width of the gap portion. According to such an aspect, the gap portion can be efficiently and accurately filled up.

(8) In the above aspect, in the third step, the three-dimensional shaped article may be shaped by ejecting the shaping material from a first nozzle and a second nozzle having a nozzle diameter different from a nozzle diameter of the first nozzle according to the second shaping data. According to such an aspect, the thickness of the layer to be shaped can be simply changed by switching the nozzle from which the shaping material is ejected, and therefore, the three-dimensional shaped article can be shaped by a simpler method.

(9) According to the second aspect of the present disclosure, a three-dimensional shaping apparatus is provided. The three-dimensional shaping apparatus includes a stage, an ejection section that ejects a shaping material to the stage, a moving mechanism section that moves the ejection section with respect to the stage, and a control unit that controls the ejection section and the moving mechanism section so as to eject a shaping material to the stage from the ejection section according to a path including multiple partial paths and stack layers, thereby shaping a three-dimensional shaped article. The control unit specifies a gap portion occurring inside the three-dimensional shaped article based on first shaping data having data for shaping a first portion that is a part of the three-dimensional shaped article by stacking layers having a first thickness and data for shaping a second portion that is a part of the three-dimensional shaped article and is adjacent to the first portion in a direction orthogonal to a stacking direction of the layers with a layer having a second thickness corresponding to a thickness of the first portion, generates second shaping data from the first shaping data by changing the first shaping data so as to fill up the gap portion when the gap portion is specified, and shapes the three-dimensional shaped article by ejecting the shaping material from the ejection section according to the second shaping data.

According to such an aspect, the second portion is shaped with a layer having a thickness corresponding to that of the first portion, and therefore, the strength of the three-dimensional shaped article in the stacking direction is improved. Further, the second shaping data are generated by changing the first shaping data so as to fill up the gap portion, and therefore, the occurrence of a void in the three-dimensional shaped article is suppressed. Accordingly, the strength of the three-dimensional shaped article is improved.

(10) According to the third aspect of the present disclosure, an information processing apparatus for generating data for producing a three-dimensional shaped article by ejecting a shaping material to a stage and stacking layers according to a path including multiple partial paths is provided. The information processing apparatus includes a data generating section that specifies a gap portion occurring inside the three-dimensional shaped article based on first shaping data having data for shaping a first portion that is a part of the three-dimensional shaped article by stacking layers having a first thickness and data for shaping a second portion that is a part of the three-dimensional shaped article and is adjacent to the first portion in a direction orthogonal to a stacking direction of the layers with a layer having a second thickness corresponding to a thickness of the first portion, and generates second shaping data from the first shaping data by changing the first shaping data so as to fill up the gap portion when the gap portion is specified.

According to such an aspect, the second portion is shaped with a layer having a thickness corresponding to that of the first portion, and therefore, the strength of the three-dimensional shaped article in the stacking direction is improved. Further, the second shaping data are generated by changing the first shaping data so as to fill up the gap portion, and therefore, the occurrence of a void in the three-dimensional shaped article is suppressed. Accordingly, the strength of the three-dimensional shaped article is improved.

What is claimed is:

1. A three-dimensional shaped article production method for producing a three-dimensional shaped article by ejecting a shaping material to a stage and stacking layers according to a path including multiple partial paths, comprising: a first step of specifying a gap portion occurring inside the three-dimensional shaped article based on first shaping data having data for shaping a first portion that is a part of the three-dimensional shaped article by stacking a plurality of layers each having a first thickness, and data for shaping a second portion that is a part of the three-dimensional shaped article and is adjacent to the first portion in a direction orthogonal to a stacking direction of the layers, the second portion being a single layer having a second thickness corresponding to a total thickness of the first portion; a second step of generating second shaping data from the first shaping data by changing the first shaping data so as to fill up the gap portion when the gap portion is specified;
wherein in the second step, the second shaping data are generated by generating data for shaping while increasing the line width in the partial path adjacent to the gap portion;
wherein in the second step, when a first partial path and a second partial path are adjacent to the gap portion, the second shaping data are generated by generating data for shaping while increasing the line width in the second partial path, and then,
generating data for shaping while increasing the line width in the first partial path adjacent to the gap portion that is shrunk after the line width of the second partial path is increased, the second partial path being located closer to a center of the three-dimensional shaped article than the first partial path;
and a third step of shaping the three-dimensional shaped article by ejecting the shaping material according to the second shaping data.

2. The three-dimensional shaped article production method according to claim 1, wherein
in the second step, the second shaping data are generated by generating data for ejecting the shaping material with a line width smaller than a line width to be realized by the data for shaping the second portion with the layer having the second thickness.

3. The three-dimensional shaped article production method according to claim 1, wherein
in the second step, the second shaping data are generated by generating data for shaping a layer having a third thickness smaller than the second thickness in the gap portion.

4. The three-dimensional shaped article production method according to claim 3, wherein
in the second step, when multiple layers having the third thickness overlap with one another in the stacking direction, the second shaping data are generated by changing the data for shaping the multiple overlapping layers having the third thickness to data for shaping a layer having a fourth thickness corresponding to a thickness of the multiple overlapping layers having the third thickness.

5. The three-dimensional shaped article production method according claim 1, wherein in the second step when a first partial path and a second partial path are adjacent to the gap portion, the second shaping data are generated by generating data for shaping while increasing the line width in the second partial path without changing the line width in the first partial path, the second partial path being located closer to a center of the three-dimensional shaped article than the first partial path.

6. The three-dimensional shaped article production method according to claim 2, wherein
in the second step, the second shaping data are generated by generating data for shaping while changing the line width of the partial path adjacent to the gap portion according to a width of the gap portion.

7. The three-dimensional shaped article production method according to claim 1, wherein
in the third step, the three-dimensional shaped article is shaped by switching, according to the second shaping data, between ejecting the shaping material from a first nozzle and ejecting the shaping material from a second nozzle, the second nozzle having a nozzle diameter different from a nozzle diameter of the first nozzle.

* * * * *